US007953661B2

(12) United States Patent
Laskin et al.

(10) Patent No.: US 7,953,661 B2
(45) Date of Patent: May 31, 2011

(54) METHOD AND APPARATUS FOR DETERMINING PERSONAL QUALIFIED DIVIDEND INCOME AND GENERATING INFORMATION STATEMENTS THEREOF

(75) Inventors: Dori Laskin, Fort Washington, PA (US); Michael A. Bray, West Chester, PA (US); Thomas J. Cresswell, Schwenksville, PA (US); Deanna J. Flores, Havertown, PA (US); Andrea A. Gasser, Broomall, PA (US); Mary H. Pichola, Lafayette Hill, PA (US); Robert P. Smith, West Chester, PA (US)

(73) Assignee: The Vanguard Group, Inc., Malvern, PA (US)

( * ) Notice: Subject to any disclaimer, the term of this patent is extended or adjusted under 35 U.S.C. 154(b) by 2161 days.

(21) Appl. No.: 10/709,360

(22) Filed: Apr. 29, 2004

(65) Prior Publication Data
US 2004/0210501 A1 Oct. 21, 2004

(51) Int. Cl.
*G06Q 40/00* (2006.01)
(52) U.S. Cl. ........... 705/40; 705/36 R; 705/36 T; 705/19
(58) Field of Classification Search ............... 705/36 R, 705/36 T, 19
See application file for complete search history.

(56) References Cited

U.S. PATENT DOCUMENTS

| | | | | |
|---|---|---|---|---|
| 6,064,983 | A * | 5/2000 | Koehler ........................... | 705/31 |
| 7,016,873 | B1 * | 3/2006 | Peterson et al. ............. | 705/36 R |
| 7,165,044 | B1 * | 1/2007 | Chaffee ........................... | 705/37 |
| 2003/0097324 | A1 * | 5/2003 | Speckman ....................... | 705/36 |
| 2004/0078271 | A1 * | 4/2004 | Morano et al. .................. | 705/19 |
| 2006/0155632 | A1 * | 7/2006 | Cherkas et al. ............. | 705/36 R |

OTHER PUBLICATIONS

By Sheryl Eighner, "Dividend and Capital Gain Changes under the Jobs and Growth Relief Reconciliation Act (JGTRRA): Adding Complexity for Investors", Jul./Aug. 2003, PriceWaterhouse Coopers, PFS 125, pp. 6-7.*
"Div Tracker", Feb. 5, 2004, www.qualified-dividends.com, featured in www.archive.org.*
"2003 Distribution Schedule", Jan. 21, 2004, www.ifa.com, featured in www.archive.org.*
"Jobs and Growth Tax Relief Reconciliation Act of 2003", Jun. 2003, Morrison Foerster, www.mofo.com.*
"Dividend-Tax Cut is Causing More Errors on 1099 Forms", Feb. 19, 2004, Wall Street Journal, as featured in www.1099pro.com.*
"Jobs and Growth Tax Relief Reconciliation Act of 2003", May 28, 2003, Public Law 108-27 108th Congress, as featured on www.wikisource.com.*
By Carr, Rebecca C.; Quinn, Tina, "Tax Relief—Chapter 2003: What CPAs Need to Know About the New Tax Act", Oct. 1, 2003, Journal of Accountancy, Oct. 2003, starting on p. 41, as featured on www.dialogweb.com.*

(Continued)

*Primary Examiner* — Charles R Kyle
*Assistant Examiner* — Irene Kang
(74) *Attorney, Agent, or Firm* — Panitch Schwarze Belisario & Nadel LLP

(57) ABSTRACT

Personal qualified dividend income (QDI) is calculated for one or more investors for mutual fund dividend distributions made to accounts of the investors from one or more mutual funds. Personal QDI information may be automatically generated and provided to investors. A similar process may be performed for brokerage accounts that hold individual stocks.

5 Claims, 20 Drawing Sheets

OTHER PUBLICATIONS

The New Tax Law and Mutual Funds, Copyright © 2003, Charles Schwab & Co., Inc., printout from Charles Schwab web site: http://www.schwab.com/SchwabNOW/SNLibrary/SNLib133/SN133mainInvestmentTopics_New_Tax_Law_MF.html, printout date: Dec. 8, 2003, 4 pages.

Change in Dividend Tax Rate and Expectations, New release date: Jul. 10, 2003, Copyright © 2003, Asher & Company, Ltd., printout from Asher & Company web site: http://www.asherco.com/news/2003/071003b.htm, printout date: Oct. 22, 2003, 2 pages.

Allison, G. "The 'Simple' Tax Act," Article date: Jun. 2003, Copyright © 2003, Northern Trust, printout from link on Northern Trust web site: http://www.ntrs.com/library/personal/taxact/, printout date: Dec. 8, 2003, 2 pages.

About Form 1099-DIV: Dividends and Distributions, Copyright © 2003, AIM Management Group, Inc. printout from AIM Investments web site: http://www.aiminvestments.com/generic/0,,-1_3111,00.html, printout date: Dec. 8, 2003, 5 pages.

News Release: New DivTracker from GainsKeeper Helps Taxpayers Calculate, Report Qualified Dividends, News Release date: Feb. 12, 2004, printout from web site: http://www.cch.com/press/news/2004/20040212tb.asp?fr=print, printout date: May 11, 2004, 2 pages.

DivTracker by GainsKeeper, printout from web site: http://www.qualified-dividends.com/, printout date: May 11, 2004, 1 page.

* cited by examiner

FIRST DATABASE

| $20_1$ | MUTUAL FUND 1 |
|---|---|
| INVESTOR | TRANSACTION DATA |
| JONES | |
| SMITH | |
| ⋮ | |
| HARRIS | |

THIRD DATABASE

| $20_1$ | MUTUAL FUND 1 |
|---|---|
| INVESTOR | ACCOUNT TYPE |
| JONES | 1234 - MONEY MARKET (NON-IRA)<br>3983 - STOCK FUND (NON-IRA) |
| SMITH | 1126 - STOCK FUND (IRA) |
| ⋮ | |
| HARRIS | 4567 - STOCK FUND (NON-IRA)<br>8901 - BOND FUND (NON-IRA) |

SECOND DATABASE

| $20_1$ MUTUAL FUND 1 | | | $20_2$ MUTUAL FUND 2 | | |
|---|---|---|---|---|---|
| YEAR OR QTR. | DIVIDEND DISTRIB. INFO | % QDI | YEAR OR QTR. | DIVIDEND DISTRIB. INFO | % QDI |
| | | | | | |
| | | | | | |
| | | | | | |

2003 Personal Qualified Dividend Income Statement

The Vanguard GROUP
P.O. BOX 2600 VALLEY FORGE, PA 19482-2600
PAGE 1 OF 1    1-800-662-2739    Rep Name

SAMPLE SHAREOWNER
PO BOX 2600
VALLEY FORGE PA 19482-2600

Recipient's Taxpayer Identification Number
123-45-6789

As-Of: 10-17-2003

| Fund Name | Recipient's Fund & Account Number | Ordinary Dividends from 1099-Div (Box 1a) | Qualified Dividends from 1099-Div (Box 1b) | Personal Qualified Dividends |
|---|---|---|---|---|
| BALANCED INDEX FUND INV | 2 - 00000001234 | 50.00 | 18.50 | 10.25 |
| VALUE INDEX FUND INV | 6 - 00000001234 | 20.00 | 12.00 | 5.21 |
| WINDSOR FUND INVESTOR | 22 - 00000001234 | 75.00 | 22.00 | 6.32 |
| PRIME MONEY MARKET | 30 - 00000001234 | Not eligible for Qualified Dividend Income | | |

*Fig. 6*

Fund Level Information and Transaction History:

Quarterly Dividend: Ex-Dates: 3/30/03, 6/30/03, 9/30/03, 12/28/03
NAV = $1.00, Div/Share for each Dividend = $.10/share

| Trade Date | Transaction Type | Share Amount | Share Balance | Purchase Qualifed On |
|---|---|---|---|---|
| 2/13/03 | Purchase | 1000 | 1000 | |
| 2/15/03 | Purchase | 100 | 1100 | 4/15/03 |
| 2/28/03 | Exchange In | 50 | 1150 | 4/28/03 |
| 3/15/03 | Purchase | 10 | 1160 | 5/15/03 |
| 3/15/2003 (As-Of from 4/5/03) | Purchase Reversal | -10 | 1150 | 5/15/03 |
| 3/15/2003 (As-Of from 4/5/03) | As-Of Purchase | 100 | 1250 | |
| 3/29/03 | Redemption | -250 | 1000 | |
| 3/30 Dividend Paid on 1000 Shares | | | | |
| 3/30/03 | Dividend Reinvestment | 100 | 1100 | 5/30/03 |
| 3/30/03 | Dividend Purchase (DDP) | 150 | 1250 | 5/30/03 |
| 4/14/03 | Redemption | -350 | 900 | |
| 4/15/03 | Purchase | 100 | 1000 | 6/15/03 |
| 5/2/03 | Redemption | -450 | 550 | |
| 5/10/03 | Transfer In | 1000 | 1550 | 7/10/03 |
| 5/15/03 | Purchase | 100 | 1650 | 7/15/03 |
| 6/3/03 | Exchange Out | -250 | 1400 | |
| 6/4/03 | Purchase | 900 | 2300 | 8/4/03 |
| 6/15/03 | Purchase | 100 | 2400 | 8/15/03 |
| 6/22/03 | Purchase | 1350 | 3750 | 8/22/03 |
| 6/30 Dividend Paid on 3750 Shares | | | | |
| 6/30/03 | Dividend Reinvestment | 375 | 4125 | 8/30/03 |
| 6/30/03 | Dividend Purchase (DDP) | 200 | 4325 | 8/30/03 |
| 7/10/03 | Redemption | -2500 | 1825 | |
| 7/15/03 | Purchase | 200 | 2025 | 9/15/03 |
| 8/15/03 | Purchase | 200 | 2225 | 10/15/03 |
| 9/15/03 | Purchase | 275 | 2500 | 11/15/03 |
| 9/30 Dividend Paid on 2500 Shares | | | | |
| 9/30/03 | Dividend Reinvestment | 250 | 2750 | 11/30/03 |
| 9/30/03 | Dividend Purchase (DDP) | 140 | 2890 | 11/30/03 |
| 10/15/03 | Purchase | 200 | 3090 | 12/15/03 |
| 11/15/03 | Purchase | 200 | 3290 | 1/15/04 |
| 12/15/03 | Purchase | 210 | 3500 | 2/15/04 |
| 12/28 Dividend Paid on 3500 Shares | | | | |
| 12/28/03 | Dividend Reinvestment | 350 | 3850 | 2/28/04 |
| 12/28/03 | Dividend Purchase (DDP) | 150 | 4000 | 2/28/04 |
| 1/15/04 | Purchase | 200 | 4200 | 3/15/04 |
| 2/12/2004 | Redemption | -2000 | 2200 | |
| 2/15/2004 | Purchase | 200 | 2400 | 4/15/04 |

*Fig. 7*

Personal QDI Calculator

| 3/30 Dividend Period (1/30 – 5/30 Period) | |
|---|---|
| Beginning Share Balance for the Holding Period (1/30): | 0 |
| Amount of Shares Redeemed in the Holding Period: | 1060 |
| More shares redeemed during the holding period than were owned at the beginning of the holding period | |
| Amount of Shares Redeemed between 60 calendar days prior to the Ex-Dividend Date and the Ex-Dividend Date (Share Amount A): | 260 |
| Share Amount B = Beginning Share Balance – Share Amount A = (0 – 260) | -260 |
| "Interim" number of shares that are qualified for the Dividend Distribution period. (Share Amount C) | 0 |
| Amount of Shares Purchased between 60 calendar days prior to the Ex-Dividend Date and 1 calendar day prior to Ex-Dividend Date (Share Amount D) | 1260 |
| Share Amount E = Share Amount D + Share Amount B = 1260 + (-260) | 1000 |
| Amount of shares redeemed between the Ex-Dividend Date and 60 calendar days after the Ex-Dividend Date. (Share Amount F) | 800 |
| Share Amount G = Share Amount E – Share Amount F = 1000 – 800 | 200 |
| QDI Share Amount = Share Amount C + Share Amount G = (0 + 200) | 200 |
| 6/30 Dividend Period (4/30 – 8/30 Period) | |
| Beginning Share Balance for the Holding Period (4/30): | 1000 |
| Amount of Shares Redeemed in the Holding Period: | 3200 |
| More shares redeemed during the holding period than were owned at the beginning of the holding period | |
| Amount of Shares Redeemed between 60 calendar days prior to the Ex-Dividend Date and the Ex-Dividend Date (Share Amount A): | 700 |
| Share Amount B = Beginning Share Balance – Share Amount A = (1000 – 700) | 300 |
| "Interim" number of shares that are qualified for the Dividend Distribution period. (Share Amount C) | 300 |
| Amount of Shares Purchased between 60 calendar days prior to the Ex-Dividend Date and 1 calendar day prior to Ex-Dividend Date (Share Amount D) | 3450 |
| Share Amount E = Share Amount D + Share Amount B = 3450 + 3500 | 3750 |
| Amount of shares redeemed between the Ex-Dividend Date and 60 calendar days after the Ex-Dividend Date. (Share Amount F) | 2500 |
| Share Amount G = Share Amount E – Share Amount F = 3750 – 2500 | 1250 |
| QDI Share Amount = Share Amount C + Share Amount G = (300 + 1250) | 1550 |
| 9/30 Dividend Period (7/30 – 11/30 Period) | |
| Beginning Share Balance for the Holding Period (7/30): | 1200 |
| Amount of Shares Redeemed in the Holding Period: | 0 |
| No shares redeemed during the holding period, therefore, Dividend Amount is QDI | |
| QDI Share Amount = (9/30 Dividend Paid on 1600 shares) | 1600 |
| 12/28 Dividend Period (10/28 – 2/28 Period) | |
| Beginning Share Balance for the Holding Period (10/28): | 2100 |
| Amount of Shares Redeemed in the Holding Period: | 2000 |
| Less shares redeemed during the holding period than were owned at the beginning of the holding period, therefore, Dividend Amount is QDI | |
| QDI Share Amount = (12/28 Dividend Paid on 2500 shares) | 2500 |

| Dividend Period | Personal QDI Shares | Personal QDI Dollar Amount |
|---|---|---|
| 3/30/03 | 200 | $20 |
| 6/30/03 | 1550 | $155 |
| 9/30/03 | 1600 | $160 |
| 12/28/03 | 2500 | $250 |
| Total for fund for tax year 2003 | 5850 | $585 |

\** The Total Personal QDI Dollar Amount must be multiplied by the fund's actual QDI% for Dividend Income and added to the "qualified" Short Term Capital (Short Term Capital Gain for the holding X fund's QDI% for Short Term Cap Gain)

*Fig. 8A*

Personal QDI Calculator

| 3/30 Dividend Period (1/29 – 5/29 Period) | |
|---|---|
| Calculate Personal QDI Amount for a Dividend Distribution Period | |
| Ex-Dividend Date: | 3/30/03 |
| Beginning Date for Holding Period: | 1/29/03 |
| Ending Date for Holding Period: | 5/29/03 |
| Ex-Dividend Date - 60: | 1/29/03 |
| Ex-Dividend Date - 61: (AG 2/27 - new row) | 1/28/03 |
| QDI Share Amount Calculation for Holding Period | |
| Beginning Share Balance for the Holding Period: Ending Share Balance on Ex-Div - 61(AG 2/27). Add the share amount of any Admiral Conversions into the holding with a trade date >= Ex-Dividend Date – 60 (AG 2/27) and < Ex-Dividend Date | 0.000 |
| Are there any redemptions with trade date >= Ex-Dividend and < Ex-Dividend Date + 60? If yes, proceed to next row. If no, skip down to the No Detailed Calc Needed Table below | |
| Amount of Shares Redeemed in the Holding Period: Redemptions with a trade date >= Ex-Dividend Date - 60 (AG 2/27) and < Ex-Dividend Date + 60, including Redemption Reversals Offset the Redemptions with the Redemption Reversals | 1050.000 |
| Is the number of shares redeemed during the holding period less than or equal to the number of shares owned at the beginning of the holding period? If yes, skip down to the No Detailed Calc Needed Table below. If no, proceed to next row. | |
| Are there any purchases with a trade date >= Ex-Dividend Date – 60 (AG 2/27) and < Ex-Dividend Date? If yes, use Detailed calc worksheet. If no, skip down to the No Detailed Calc Needed Table below. | |
| Results of Detailed Calc: (Dividend Amount computed using Detailed Calc tab) | |
| Sum of Qualified "Purchase" Shares after "processing" all redemptions and subtracting Admiral Conversion Out transactions. (From Cell D64 on "Detailed Calc" Tab) | 650.000 |
| Fund's Dividend Amount per Share for Distribution Period: | $0.10000000 |
| QDI Dividend Amount Distribution Period: Enter this amount in the appropriate row in the Sum QDI Dividend Amounts for Specified Timeframe Table below. | $65.00 |

| 6/30 Dividend Period (5/1 – 8/29 Period) | |
|---|---|
| Calculate Personal QDI Amount for a Dividend Distribution Period | |
| Ex-Dividend Date: | 6/30/03 |
| Beginning Date for Holding Period: | 5/1/03 |
| Ending Date for Holding Period: | 8/29/03 |
| Ex-Dividend Date - 60: | 5/1/03 |
| Ex-Dividend Date - 61: (AG 2/27 - new row) | 4/30/03 |
| QDI Share Amount Calculation for Holding Period | |
| Beginning Share Balance for the Holding Period: Ending Share Balance on Ex-Div - 61(AG 2/27). Add the share amount of any Admiral Conversions into the holding with a trade date >= Ex-Dividend Date – 60 (AG 2/27) and < Ex-Dividend Date | 1000.000 |
| Are there any redemptions with trade date >= Ex-Dividend and < Ex-Dividend Date + 60? If yes, proceed to next row. If no, skip down to the No Detailed Calc Needed Table below | |

*Fig. 8B*

Personal QDI Calculator

| | |
|---|---:|
| Amount of Shares Redeemed in the Holding Period:<br>Redemptions with a trade date >= Ex-Dividend Date - 60 (AG 2/27) and < Ex-Dividend Date + 60, including Redemption Reversals<br>Offset the Redemptions with the Redemption Reversals | 3200.000 |
| Is the number of shares redeemed during the holding period less than or equal to the number of shares owned at the beginning of the holding period?<br>  If yes, skip down to the No Detailed Calc Needed Table below.<br>  If no, proceed to next row. | |
| Are there any purchases with a trade date >= Ex-Dividend Date – 60 (AG 2/27) and < Ex-Dividend Date?<br>  If yes, use Detailed calc worksheet.<br>  If no, skip down to the No Detailed Calc Needed Table below. | |
| Results of Detailed Calc: (Dividend Amount computed using Detailed Calc tab) | |
| Sum of Qualified "Purchase" Shares after "processing" all redemptions and subtracting Admiral Conversion Out transactions (From Cell D64 on "Detailed Calc" Tab) | 2550.000 |
| Fund's Dividend Amount per Share for Distribution Period: | $0.10000000 |
| QDI Dividend Amount Distribution Period: | $255.00 |
| Enter this amount in the appropriate row in the Sum QDI Dividend Amounts for Specified Timeframe Table below. | |

| | |
|---|---:|
| 9/30 Dividend Period (8/1 – 11/29 Period) | |
| Calculate Personal QDI Amount for a Dividend Distribution Period | |
| Ex-Dividend Date: | 9/30/04 |
| Beginning Date for Holding Period: | 8/1/04 |
| Ending Date for Holding Period: | 11/29/04 |
| Ex-Dividend Date - 60: | 8/1/04 |
| Ex-Dividend Date - 61: (AG 2/27 - new row) | 7/31/04 |
| QDI Share Amount Calculation for Holding Period | |
| Beginning Share Balance for the Holding Period:<br>Ending Share Balance on Ex-Div - 61(AG 2/27). Add the share amount of any Admiral Conversions into the holding with a trade date >= Ex-Dividend Date – 60 (AG 2/27) and < Ex-Dividend Date | 2025.000 |
| Are there any redemptions with trade date >= Ex-Dividend and < Ex-Dividend Date + 60?<br>  If yes, proceed to next row.<br>  If no, skip down to the No Detailed Calc Needed Table below. | |
| Amount of Shares Redeemed in the Holding Period:<br>Redemptions with a trade date >= Ex-Dividend Date - 60 (AG 2/27) and < Ex-Dividend Date + 60, including Redemption Reversals<br>Offset the Redemptions with the Redemption Reversals | 0.000 |
| No Detailed Calc Needed: (Entire Dividend Amount is qualified) | |
| Number of Shares owned on Record Date:<br>(Record Date is the first business day prior to the Ex-Dividend Date) | 2500.000 |
| Fund's Dividend Amount per Share for Distribution Period: | $0.10000000 |
| QDI Dividend Amount Distribution Period: | $250.00 |
| Enter this amount in the appropriate row in the Sum QDI Dividend Amounts for Specified Timeframe Table below. | |

| | |
|---|---:|
| 12/28 Dividend Period (10/29 – 2/26 Period) | |
| Calculate Personal QDI Amount for a Dividend Distribution Period | |
| Ex-Dividend Date: | 12/28/03 |
| Beginning Date for Holding Period: | 10/29/03 |
| Ending Date for Holding Period: | 2/26/04 |

*Fig. 8C*

Personal QDI Calculator

| | |
|---|---|
| Ex-Dividend Date - 60: | 10/29/03 |
| Ex-Dividend Date - 61: (AG 2/27 - new row) | 10/28/03 |
| QDI Share Amount Calculation for Holding Period | |
| Beginning Share Balance for the Holding Period: | 3090.000 |
| Ending Share Balance on Ex-Div - 61(AG 2/27). Add the share amount of any Admiral Conversions into the holding with a trade date >= Ex-Dividend Date - 60 (AG 2/27) and < Ex-Dividend Date | |
| Are there any redemptions with trade date >= Ex-Dividend and < Ex-Dividend Date + 60? | |
| If yes, proceed to next row. | |
| If no, skip down to the No Detailed Calc Needed Table below | |
| Amount of Shares Redeemed in the Holding Period: | 2000.000 |
| Redemptions with a trade date >= Ex-Dividend Date - 60 (AG 2/27) and < Ex-Dividend Date + 60, including Redemption Reversals Offset the Redemptions with the Redemption Reversals | |
| Is the number of shares redeemed during the holding period less than or equal to the number of shares owned at the beginning of the holding period? | |
| If yes, skip down to the No Detailed Calc Needed Table below. | |
| If no, proceed to next row. | |
| Are there any purchases with a trade date >= Ex-Dividend Date - 60 (AG 2/27) and < Ex-Dividend Date? | |
| If yes, use Detailed calc worksheet. | |
| If no, skip down to the No Detailed Calc Needed Table below. | |
| No Detailed Calc Needed:  (Entire Dividend Amount is qualified) | |
| Number of Shares owned on Record Date: (Record Date is the first business day prior to the Ex-Dividend Date) | 3500.000 |
| Fund's Dividend Amount per Share for Distribution Period: | $0.10000000 |
| QDI Dividend Amount Distribution Period: Enter this amount in the appropriate row in the Sum QDI Dividend Amounts for Specified Timeframe Table below. | $350.00 |

*Fig. 8D*

| Sum QDI Dividend Amounts for Specified Timeframe Note: Populate for as many Dividend Distributions as needed within the Specified Timeframe | QDI Dividend Amount | Was a Detailed Calc Needed to determine this amount? (Answer Yes or No) |
|---|---|---|
| Ex-Dividend Date: 03/30/2003 | $65.00 | Yes |
| Ex-Dividend Date: 06/30/2003 | $255.00 | Yes |
| Ex-Dividend Date: 09/30/2003 | $250.00 | No |
| Ex-Dividend Date: 12/28/2003 | $350.00 | No |
| Sum of each QDI Dividend Amount for Specified Timeframe | $920.00 | For Previous Tax Year Actuals, if all = "no", QDI Amount for Previous Tax Year = box 1b on 1099-DIV. Copy QDI amount (box 1b) as Personal QDI Amount. No need to proceed any further. |

*** The Total Personal QDI Dollar Amount must be multiplied by the fund's actual QDI% for Dividend Income and added to the "qualified" Short Term Capital (Short Term Capital Gain for the holding X fund's QDI% for Short Term Capital Gain)

*Fig. 8E*

Date Clarifications

The shareholder must hold the shares for more than 60 calendar days within a 121 calendar day period around the Ex-Dividend Date for the fund. (Don't count the day you buy but count the day you sell.)

| | |
|---|---|
| Ex-Dividend Date: | 6/20/2003 |
| Ex-Div – 61: | 4/20/2003 |
| Ex-Div – 60: | 4/21/2003 |
| Ex-Div + 60: | 8/19/2003 |
| Ex-Div – 1: | 6/19/2003 |

The system determines the beginning share balance for the holding period as the share balance in the holding 60 calendar days prior to the Ex-Dividend Date.

| | | |
|---|---|---|
| Beginning balance: | Ending share balance on Ex-Div – 61 | (4/20/2003) |
| Purchases: | Trade date >= Ex-Div –60 and <=Ex-Div – 1 | (>=4/21/2003 and <= 6/20/2003) |
| Redemptions | | |
| Entire holding period: | Trade date >= Ex-Div –60 and < Ex-Div + 60 | (>=4/21/2003 and < 8/19/2003) |
| Redeem-shares-1: | Trade date >= Ex-Div –60 and <= Ex-Div –1 | (>=4/21/2003 and <= 6/20/2003) |
| Redeem-shares-2: | Trade date >= Ex-Div and < Ex-Div + 60 | (>=6/19/2003 and < 8/19/2003) |
| To "age" purchases: | Trade date >= Ex-Div - 60 and <= Trade Date of Last Purchase + 60 | |
| Based on purchase on Ex-Div –1 (6/19/2003): | | (>=4/21/2003 and <= 8/18/2003) |

| Calculate Personal QDI Amount for a Dividend Distribution Period | | |
|---|---|---|
| Ex-Dividend Date: | 1/1/03 | |
| Beginning Date for Holding Period: | 11/2/02 | |
| Ending Date for Holding Period: | 3/2/03 | |
| Ex-Dividend Date - 1: | 12/31/02 | |
| QDI Share Amount Calculation for Holding Period | | |
| Beginning Share Balance for the Holding Period: | * | Formula = (Share balance from first transaction after the beginning date - # of shares transacted) |
| Amount of Shares Redeemed in the Holding Period: | | Formula = ABS(SUM(all redemptions)) |
| Determine if the number of shares redeemed during the holding period is greater than the number of shares owned at the beginning of the holding period. If so, proceed. If not, skip down to the No Detailed Calc Needed Table below. | | |
| More shares redeemed during the holding period than were owned at the beginning of the holding period | | |
| Amount of Shares Redeemed between 60 calendar days prior to the Ex-Dividend Date and the Ex-Dividend Date (Share Amount A): | * | |
| Share Amount B = Beginning Share Balance - Share Amount A | 0.000 | |
| "Interim" number of shares that are qualified for the Dividend Distribution period. (Share Amount C) | 0.000 | Formula =ABS(SUM(all redemptions)+SUM(all redemption reversals)) |
| Amount of Shares Purchased between 60 calendar days prior to the Ex-Dividend Date and 1 calendar day prior to Ex-Dividend Date (Share Amount D) | * 0.000 | Formula =ABS(SUM(all purchases)+SUM(all purchase reversals)) |
| Share Amount E = Share Amount D + Share Amount B | 0.000 | |
| Amount of shares redeemed between the Ex-Dividend Date and 60 calendar days after the Ex-Dividend Date. (Share Amount F) | * 0.000 | Formula =ABS(SUM(all redemptions)+SUM(all redemption reversals)) |
| Share Amount G = Share Amount E – Share Amount F | 0.000 | |
| QDI Share Amount = Share Amount C + Share Amount G. If Share Amount G < 0, then QDI Share Amount = Share Amount C | 0.000 | |
| Fund's Dividend Amount per Share for Distribution Period: | $0.00000000 | Note: For REIT funds, use div amounts from Web, if not available, use Tax Reallocation View on Lotus Notes Dividend Calendar database. |
| QDI Dividend Amount per Distribution Period: | $0.00 | |

| No Detailed Calc Needed: | | |
|---|---|---|
| Number of shares redeemed during the holding period is less than or equal to number of shares owned at the beginning of the holding period | | |
| Number of Shares owned on Record Date: (Record Date is the first business day prior to the Ex-Dividend Date) | | Formula = (Share balance from first transaction after the record date - # of shares transacted) |
| Fund's Dividend Amount per Share for Distribution Period: | | |
| QDI Dividend Amount Distribution Period: | $0.00 | |

*Fig. 9A*

Use following two templates to Sum Amounts

Sum QDI Dividend Amounts for Specified Timeframe
Note: Populate for as many Dividend Distributions as needed within the Specified Timeframe

| | QDI Dividend Amount |
|---|---|
| Dividend Distribution 1 | |
| Dividend Distribution 2 | |
| Dividend Distribution 3 | |
| Dividend Distribution 4 | |
| Sum of each QDI Dividend Amount for Specified Timeframe | $0.00 |

Sum Dividend Distribution Amounts for Specified Timeframe
Note: Populate for as many Dividend Distributions as needed within the Specified Timeframe

| | Amount of Shares owned on Record Date | Fund's Dividend Amount per Share for Distribution Period | Dividend Distribution Amount |
|---|---|---|---|
| Dividend Distribution 1 | | 0.000 | 0.00 |
| Dividend Distribution 2 | | 0.000 | 0.00 |
| Dividend Distribution 3 | | 0.000 | 0.00 |
| Dividend Distribution 4 | | 0.000 | 0.00 |
| Sum Dividend Distribution Amounts for Specified Timeframe | | | 0.00 |

Time Period Totals:

| | | |
|---|---|---|
| Sum of each QDI Dividend Amount for Specified Timeframe (Result from Sum QDI Dividend Amounts for Specified Timeframe template) | | Use separate worksheet for Tax Managed Balanced fund to determine amount that should be entered into this field. |
| "Qualified" Foreign Tax Paid Amount from below for Previous Tax Year Actuals Only. Otherwise enter zero. | $0.00 | |
| Sum of each QDI Dividend Amount (with or without "qualified" Foreign Taxes Paid) | $0.00 | Formula = (Sum of QDI Dividend Amounts + "Qualified" Foreign Taxes Paid) |
| Fund's Estimated or Actual QDI % of Dividend Income | 0.00000% | |
| Personal QDI of Dividend Income (Stop here if calculating for Previous or Current Year Estimates. Proceed for Previous Tax Year Actuals.) | $0.00 | Formula = (Sum of QDI Dividend Amounts with/without "Qualified" Foreign Taxes Paid * QDI of Dividend Income) Rounded to 2 decimal places. |
| Prior Year Short Term Gain Amount (Available on QSHADIV screen.) | $0.00 | Formula = (Prior Year Short Term Gain · QDI of Short Term Gain) |
| Fund's Actual QDI % of Short Term Capital Gain | | |
| Personal QDI of Short Term Gain. (Previous Tax Year Actuals only.) | $0.00 | Formula = (Personal QDI of Dividend Income + Personal QDI of Short Term Gain) |
| Total Personal QDI for Timeperiod. | $0.00 | |

Use following for Previous Tax Year Actuals Only

"Qualified" Foreign Tax Paid Calculation
Note: Not necessary for Tax Managed Balanced or REIT Funds

| | | |
|---|---|---|
| "Qualifying Dividend Amount" = Sum of QDI Dividend Amount per Distribution Period for timeframe | 0 | Same as entered above |
| Prior Year Dividend Amount. (Result from Sum Dividend Distribution Amounts for Specified Timeframe template.) | 0 | |
| Foreign Tax Paid (box 6 on 1099-Div. Available on TX1099D screen.) | 0 | |
| "Qualified" Foreign Tax | #DIV/0! | Formula = ((Qualifying Div Amount/Prior Year Dividend Amount) * Foreign Tax Paid) |

*Fig. 9B*

Purpose:
This template will calculate the "Qualified" Taxable Dividend Amount meeting the holding period requirement for Previous Tax Year Actuals for the Tax Managed Balanced Fund - #103.

Instructions:
1. Enter Tax Exempt % from the VAST FDINCAL screen.
2. Region: Tax Managed Balance Fund #103

```
SCRN: Q355 FDINCAL     VANGUARD - F REGION          DATE: 10/30/03
TERM: PA34    MAINTAIN DIVIDEND TAX ALLOCATIONS     TIME: 16:00:17

FUND NBR: 0103       FUND NAME: TAX-MANAGED BALANCED FUND

AGGREGATE NONTAXABLE %       RECORD      INDIVIDUAL
              86.86                   DATE        NON-TAXABLE %
                                      MMDDYY
```

2. Enter Total Computed QDI for Previous Tax Year Actuals.
3. The "Qualified" Taxable Dividend Amount meeting the holding period requirement for Previous Tax Year Actuals will be computed.
5. Enter the result on the Manual Calculation Worksheet as the Sum of each QDI Dividend Amount for Specified Timeframe in the Time Period Totals section.

| | Tax Managed Reallocation Calculation | |
|---|---|---|
| 20 | Tax Exempt % from the VAST FDINCAL screen. | 0.000000% |
| 21 | Total Computed QDI for Previous Tax Year Actuals | $0.00 |
| 22 | "Qualified" Tax Exempt Dividend Amount | $0.00 — Formula = (Total Computed QDI for Previous Tax Year Actuals * Tax Exempt % from the VAST FDINCAL screen) |
| 23 | "Qualified" Taxable Dividend Amount | $0.00 — Formula = (Total Computed QDI for Previous Tax Year Actuals - "Qualified" Tax Exempt Dividend Amount) |

*Fig. 9C*

Select Account(s)

Holding Period Calculator

Select Accounts

Select a registration on which you would like to calculate your personal QDI (done one at a time)

☐ Registration 1

Fund 1-Account #

Fund 2-Account #

Registration 2   This registration not selectable because it is a retirement account Fund 1-Account #

Fund 2-Account #

[ Calculate ]

*Fig. 11*

Specify Timeframe: Previous Tax Year or Current Tax Year

Holding Period Calculator

Select Time Frame

● 2003 Actual - Calculate your QDI for the prior year's income

○ 2004 Estimated You can estimate your QDI for the Current Year based on estimated fund distributions.

Beginning Date - 01/01/2004
End Date - 08/06/2004

[BACK] [NEXT]

*Fig. 12*

Results for prior year

Holding Period Calculator

2003 Results

Registration 1

| Fund and Account Number | Total Ordinary Dividends from 1099DIV | Qualified Div from 1099DIV | Personal QD Amount |
|---|---|---|---|
| Fund 1-Account # | $ | $ | $ |
| Fund 2-Account # | $ | $ | $ |

Disclaimer 1
Disclaimer 2
Disclaimer 3
Disclaimer 4

[ Quit ]

[ Select another time period ]   [ Select another registration ]

*Fig. 13*

Results for current year

Holding Period Calculator

2004 Results As of 08/12/2004

Registration 1

| Fund and Account Number | Dividends paid to date | Estimated Personal QDI Amount |
|---|---|---|
| Fund 1-Account # | $ | $ |
| Fund 2-Account # | $ | $ |

Disclaimer 1
Disclaimer 2
Disclaimer 3
Disclaimer 4

[ Quit ]

[ Select another time period ]  [ Select another registration ]

METHOD AND APPARATUS FOR DETERMINING PERSONAL QUALIFIED DIVIDEND INCOME AND GENERATING INFORMATION STATEMENTS THEREOF

BACKGROUND OF INVENTION

The Jobs and Growth Tax Relief Reconciliation Act of 2003 (P.L. 108-27, 117 Stat. 752) (JGTRRA) was enacted on May 28, 2003. Subject to certain limitations, the JGTRRA generally provides that a "dividend" paid to an individual shareholder from either a domestic corporation or a "qualified foreign corporation" on or after Jan. 1, 2003 is subject to tax at the reduced rates applicable to certain capital gains. The new capital gains tax rates of either 15% or 5% (15% for shareholders in the top four federal tax brackets, and 5% for shareholders in the 10% and 15% brackets) are a substantial reduction from current rates. The JGTRRA is a complex piece of legislation and the federal government has produced a significant amount of explanatory materials to describe the application of the JGTRRA.

To comply with the JGTRRA, a new Form 1099-DIV was created. Instead of a single box 1 for ordinary dividends, the new Form 1099-DIV includes box 1a for reporting total ordinary dividends that are taxable and box 1b for reporting the portion of the amount in box 1a that may be eligible for the new 15% or 5% capital gains rate, also referred to as "qualified dividends" or "qualified dividend income" (QDI). To qualify for the 15% or 5% capital gains rates, the share of stock to which the dividend relates must be held for more than 60 days of the 121-period that begins 60 days before the "ex-dividend date". Thus, a "holding period" calculation must be performed as part of the QDI calculation. (The "ex-dividend date" is the first date on which a security is traded without entitling the buyer to receive dividend distributions previously declared. That is, the "ex-dividend date" is the date on which the seller, and not the buyer, of a stock will be entitled to a recently announced dividend.)

JGTRRA applies to individual shareholders whether they own shares of stock directly in a brokerage account or whether they own shares of stock indirectly by virtue of owning shares in a mutual fund that holds securities. Thus, each mutual fund must now calculate the percentage of its ordinary dividend income that is QDI. Some types of ordinary dividends that will not be QDI (and thus are not eligible for the reduced tax rates) include:

1. Dividends earned on stock that was not owned for long enough to meet the holding period (e.g., short-term capital gain distributions).
2. Interest from bonds and money market securities.

After a mutual fund determines the percentage, it will be used to calculate the QDI for each investor that is reported on the new Form 1099-DIV.

A mutual fund investor cannot automatically presume that the entire amount of QDI reported in box 1b of the Form 1099-DIV is entitled to the new 15% or 5% capital gains rate. This is because all of the dividend producing mutual fund shares owned by the individual investor may not have met the holding period requirement. That is, even though the mutual fund held the shares long enough so that the dividends are QDI with respect to the mutual fund, an investor may not have held their mutual fund shares for the required period of time such that the dividends are QDI in the hands of the investor. Accordingly, each mutual fund investor has its own "personal qualified dividend income" (personal QDI) which will be an amount between $0 (e.g., an investor who purchased all of their mutual fund shares within weeks of when dividends were declared) and the entire QDI (e.g., an investor who has not bought any new shares in the past year). The personal QDI is not reported on the Form 1099-DIV and there is no requirement for mutual funds to calculate what the personal QDI should be for a specific investor. It is estimated that a significant percentage of accounts managed by a mutual fund investment provider (perhaps 8-15% will have a personal QDI each year that differs from the fund QDI.

SUMMARY OF INVENTION

Personal qualified dividend income (QDI) is calculated for one or more investors for mutual fund dividend distributions made to accounts of the investors from one or more mutual funds. A first database stores account transaction history data of the investors for each of the mutual funds. A second database stores dividend distribution information for each of the mutual funds and information indicating what percentage of dividend distributions of each of the mutual funds are QDI. A QDI calculation engine receives and processes the account transaction history data, the dividend distribution information, and the percentage of mutual fund dividend distributions that are QDI from the first and second databases to automatically determine the personal QDI for a selected time frame for one or more of the investors. The account transaction history data is used to provide transaction data for a specific investor and to determine whether holding period requirements are met for a specific investor. Personal QDI information, such as personal QDI statements, may be automatically generated and provided to investors. A similar process may be performed for brokerage accounts that hold individual stocks.

BRIEF DESCRIPTION OF DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIGS. 2-4 are more detailed views of the contents of databases in FIG. 1;

FIG. 6 is a sample QDI statement;

FIG. 7, FIGS. 8A-8G and FIGS. 9A-9C, taken in combination, illustrate one preferred process for performing a personal QDI calculation based on transaction data of an investor; and FIGS. 10-14 are screen shot displays of a user interface that an investor interacts with to obtain a personal QDI from an investment provider.

DETAILED DESCRIPTION

Figure 1:
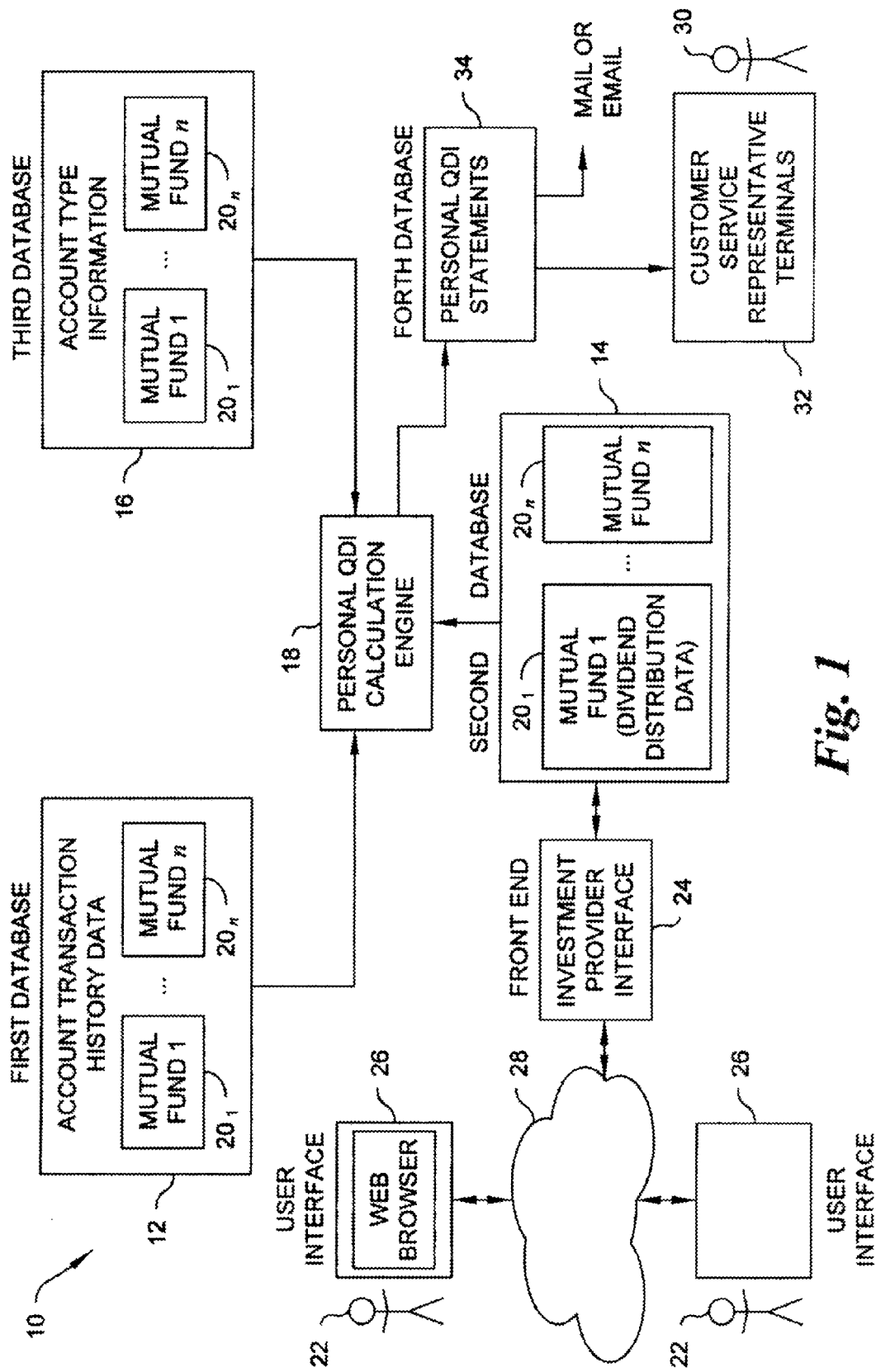
FIG. 1 is a schematic block diagram of a personal QDI calculation system in accordance with one preferred embodiment of the present invention.

Certain terminology is used herein for convenience only and is not to be taken as a limitation on the present invention. In the drawings, the same reference letters are employed for designating the same elements throughout the several figures.

I. Overview of Present Invention

FIG. 1 is a schematic block diagram of one preferred embodiment of the present invention. This embodiment is described with respect to a process developed by The Vanguard Group, a mutual fund and investment service provider, for interactive use by investors on the Vanguard web site (www.vanguard.com), as well as for internal use by Vanguard in servicing its clients. However, the scope of the present invention is not limited to such uses and may be used by any investment entity in servicing its clients.

FIG. 1 shows a system 10 which includes first database 12, a second database 14 and a third database 16, each of which provide information to a personal QDI calculation engine 18. The first database 12 stores account transaction history data of investors for one or more mutual funds 20. The second database 14 stores dividend distribution information for each of the mutual funds 20 and information indicating what percentage of dividend distributions of each of the mutual funds are QDI. The third database 16 stores account type information of the investors for each of the mutual funds. A more detailed view of the contents of the first database 12, the second database 14 and the third database 16 is provided in FIGS. 2-4. The personal QDI calculation engine 18 receives and processes the account transaction history data, the dividend distribution information, and the percentage of mutual fund dividend distributions that are QDI from the first and second databases 12 and 14 to automatically determine the personal QDI for a selected time frame for one or more of the investors. The account transaction history data is used to provide transaction data for a specific investor and to determine whether holding period requirements are met for a specific investor. Certain types of accounts such as retirement accounts and other non-taxable accounts, short-term money market accounts, bond fund accounts, corporate accounts, and accounts where the primary owner is a non-resident alien, are not eligible for QDI, and thus no personal QDI calculation would need to be performed on such accounts. The account type information stored in the third database 16 is used to inform an investor of the types of accounts that are eligible for QDI (and thus available for calculation of a personal QDI). If the system 10 is used internally to generate personal QDI statements, then the account type information is used to identify the investor accounts that need such statements.

The system 10 can be used directly by an investor 22 or internally by an investment provider (investment management company) who manages one or more mutual funds (e.g., The Vanguard Group). If used by an investor, the system 10 includes a front end (investment provider interface) 24 in communication at one end with the personal QDI calculation engine 18 and in communication at the other end with computer terminals 26 (user interfaces) via communication medium 28. The communication medium 28 may be a wired or wireless communication medium (e.g., phone, cable, satellite). The computer terminals 26 may be located anywhere in the world. Some computer terminals 26 may also be personal computers or other forms of user interfaces, such as a telephone. In one preferred embodiment of the present invention, the computer terminals 26 are personal computers and include web browsers for connecting to the front end 24 via the Internet. For example, the existing Vanguard web site can include additional functionality to allow a user to enter a time frame (e.g., previous calendar year, previous calendar quarter(s)) and the accounts for which a personal QDI is desired and receive a personal QDI statement, either immediately during the session or at a later point in time. One embodiment of this process is shown in FIGS. 10-14 described below. The web site tool is particularly helpful to investors who must file quarterly estimated returns and investors who file their income tax returns prior to a mailing of personal QDI statements.

When the system 10 is used internally by an investment provider, a customer service representative 30 interfaces directly with the personal QDI calculation engine 18 via a terminal 32 and/or accesses a fourth database 34 to view electronic versions of personal QDI statements which may have been previously automatically generated and stored, and mailed to investors. In this manner, the customer service representative 30 can assist an investor in many different ways, by either fielding questions from investors about previously mailed or emailed personal QDI statements or generating a personal QDI statement while speaking to an investor.

The ineligibility of retirement, corporate and other non-taxable accounts is based on the account type which is determined from the third database 16. However, the ineligibility of short-term money market and bond fund investments is based on the fund type, which is determined from the second database 14. First, the account type is checked, and then, if it is eligible for QDI, an attempt is made to compute personal QDI for each fund in that account. Since short-term money market and bond funds are not eligible for QDI, appropriate content is provided to the computer terminals 26 for these funds, such as a message informing the investor 22 that QDI is not applicable to those funds.

The first database 12, second database 14 and third database 16 are shown in FIG. 1 as separate databases. However, any combination of these databases may physically be subparts of a single database. Also, any of these databases may reside at physically different locations. For example, account transaction history data may be kept in records of an independent third party custodian (record keeper) that services mutual funds. Furthermore, portions of each of the databases may be at physically different locations and may be maintained by physically different entities, especially if personal QDI calculations are to be performed on mutual fund accounts of other investment providers or brokerage accounts containing individual stocks or mutual fund accounts of other investment providers. In each of these scenarios, the contents of any of the three databases may be kept outside of the investment provider that is offering the personal QDI calculation process. In one embodiment of the present invention, such contents are obtained from one or more independent third party custodians.

FIG. 2 shows additional self-explanatory details of the contents of the first database 12 for a single mutual fund 20. FIG. 3 shows additional self-explanatory details of the contents of the third database 16 for a single mutual fund 20. In the example of FIG. 3, only the Jones account 3983 and the Harris account 4567 potentially have QDI. FIG. 4 shows additional details of the second database 14. Each mutual fund 20 will likely have a different percentage value, and the percentage values for each year or quarter of a single mutual fund will also likely be different. The second database 14 also includes dividend distribution frequency and dividend amount per share information (not shown in FIG. 4).

Figure 5:
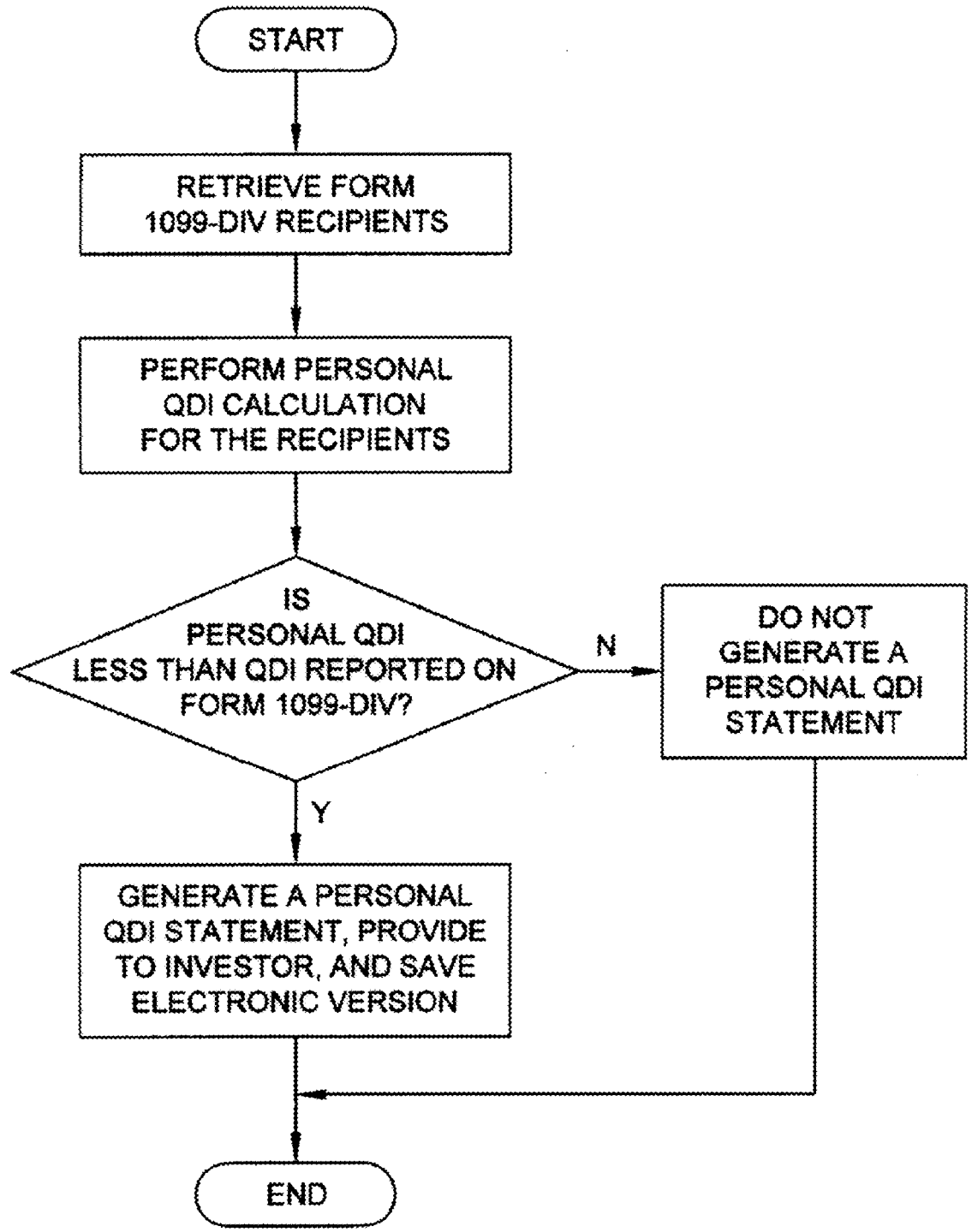
FIG. 5 is a flowchart of a process for generating personal QDI statements to selected mutual fund investors.

FIG. 5 is a flowchart of a process for generating personal qualified dividend income (QDI) statements to selected mutual fund investors. Each investor has one or more accounts in one or more mutual funds that declare dividend distributions. The steps of the method are as follows:

1. Identify mutual fund investors who are recipients of a Form 1099-DIV for at least one mutual fund. As discussed above, the Form 1099-DIV includes the QDI for each of the mutual funds that are eligible for QDI.

2. Perform a personal QDI calculation for each of the recipients.

3. Compare the personal QDI and the QDI on the Form 1099-DIV.

4. Generate a personal QDI statement for only the mutual fund investors that have personal QDI that is less than the QDI on the Form 1099-DIV, provide the statement to the investor, and save an electronic version. This step minimizes the amount of paperwork that is generated by the mutual fund and forwarded to investors. Preferably, this process is performed automatically each year (such as in March) and the personal QDI statements are provided to the investors to assist the investors in preparing income tax returns for the previous year.

FIG. 6 shows a sample personal QDI statement generated by the process described in FIG. 5. An electronic image of the personal QDI statements or the data elements necessary to reconstruct the statements are preferably stored by the investment provider in the fourth database 34 as described above for subsequent retrieval by a customer service representative, if necessary.

There are many different methods of calculating the personal QDI that likely comply with the JGTRRA and the corresponding guidelines issued by the federal government. One specific methodology is described below. This methodology uses a first in first out (FIFO) redemption methodology to make the holding period determination. However, the scope of the present invention includes accounting methods other than FIFO for holding period calculations (e.g., specific lots), and any other methodologies that calculate the personal QDI in a manner that complies with the JGTRRA.

The process described above for mutual fund investors is equally applicable to brokerage accounts. Brokerage accounts include shares of individual stocks (i.e., stock holdings). A brokerage account may also hold mutual fund shares that are for funds outside of the investment provider (investment management company) that is providing the personal QDI calculation service. If so, then the personal QDI calculation engine 18 must retrieve the appropriate information for that mutual fund from the databases that contain the information. Additional considerations for performing personal QDI calculations on brokerage accounts are described below.

II. Detailed Disclosure

One implementation of the present invention is described below.
A. Software/Database Details
First, second and third databases 12, 14, 16: IBM DB2 database software
Personal QDI Calculation Engine:
i. Java user interface
ii. DB2 and COBOL used for the web site and internal process
iii. mid-tier server—UNIX box
iv. web site personal QDI calculation programmed in Java
v. internal calculation of personal QDI programmed in COBOL
B. Detailed Flowchart of Personal QDI Calculation Process
Input Parameters (from Web Site Interface)
i. User selects one Vanguard Mutual Fund Account.
ii. Only accounts that receive a Form 1099-DIV are eligible for the calculation.
iii. User specifies time frame for calculator:
a. Previous Tax Year—Used for tax return preparation.
b. Previous or Current Tax Year Estimates—Used for quarterly estimates.
JGTRRA Holding Period:
|_____|_____|Ex-Div—60 calendar days Ex-Dividend Date Ex-Div+60 calendar days
Process Steps for Mutual Fund Accounts
1. Personal QDI will be calculated for each holding (fund) in the selected account by examining each fund's dividend distribution within the specified timeframe.
2. Retrieve the fund's dividend distribution frequency (Record Date(s) and Ex-Dividend date(s)), dividend amounts per share and estimated or actual QDI percentages.
3. Determine if the fund declared a dividend during the specified time period.
4. Determine if the fund is eligible for QDI.
5. Proceed to next holding if no dividends were declared during specified timeframe or if the fund is not eligible for QDI.
6. Determine if the holding received the dividend by calculating the amount of shares owned on Record Date. (Due to the potential for dividend adjustments, this approach was chosen over obtaining the dividend transaction(s) from transaction history. However, either approach may be used.)
7. If the holding received the dividend, determine what portion meets the holding period requirement.
8. The calculator assumes shares are redeemed using First In First Out (FIFO) method.

For this calculator, a redemption is defined as a transaction that debits the share balance, with the exception of conversions among share classes of that fund.
i. Conversions of one share class to another will not be considered a redemption of the same fund.
ii. A net transfer of shares out of a holding is considered a redemption.
iii. In the event of a transaction reversal, the original and subsequent transactions are ignored.
9. If no shares were redeemed during the holding period, the entire dividend amount meets the holding period requirement.
10. Determine the amount of shares owned at the beginning of the holding period.
11. Determine the amount of shares redeemed during the holding period.
12. If the amount of shares redeemed during the holding period is less than or equal to the amount of shares owned at the beginning of the holding period, the entire dividend amount meets the holding period requirement. Otherwise, the tool will compute the number of shares meeting the holding period requirement and determine the appropriate dividend amount.
13. Determine the amount of shares that meet the holding period requirement on Ex-Dividend date by subtracting the amount of shares redeemed between the beginning of the holding period and the Ex-Dividend date from the amount of shares owned at the beginning of the holding period.
14. Retain this share amount as the "interim QDI share amount" for later use by the calculator. (Set to zero if negative.)
15. Add the amount of shares purchased between the beginning of the holding period and the Ex-Dividend date minus 2 calendar days.
a. For this calculator, a purchase is defined as a transaction that credits the share balance, with the exception of conversions from one share class of a mutual fund to another share class of that same mutual fund.
i. These types of conversions into a holding will not be considered a purchase. The holding period for such conversions will be determined by reference to the holding period of any of the share classes for the mutual fund.
ii. A net transfer of shares into a holding is considered a purchase.
iii. In the event of a transaction reversal, the original and subsequent transactions are ignored.

16. Subtract the amount of shares redeemed between the Ex-Dividend Date and the end of the holding period.
17. Add the remaining shares to the "interim QDI share amount" to determine the number of shares to meet the holding period requirement for the dividend distribution.
18. Multiply the applicable shares by the dividend amount per share to determine the dividend amount meeting the holding period requirement for the dividend distribution.
19. Once the dividend amount meeting the holding period requirement for each dividend distribution period within the specified timeframe has been calculated, sum the amounts.
20. Multiply the sum of all dividends meeting the holding period requirement for the specified time frame (calculated in step 19) by the fund's QDI to determine the amount of personal QDI for the holding.
a. For Previous Tax Year timeframe, multiply by the fund's actual QDI percentage of Dividend Income and add the "qualified" Short Term Capital Gain Amount (short term capital gains amount distributed for the holding for the previous tax year multiplied by the fund's actual QDI percentage of Short Term Capital Gain).
b. For Previous or Current Tax Year timeframes, multiply by the fund's estimated QDI percentage of Dividend Income.
21. Once the personal QDI amount has been calculated for each holding in the selected account, provide the results to the User: (Current Date; Timeframe for the personal QDI calculation; Account Name for the selected Account; for each holding within the Account: Holding Name; Fund/Account Number; an indication that the holding was not eligible for QDI.)
a. Display the following data when calculating Personal QDI for Previous Tax Year: (Total Ordinary Dividends reported as box 1a on the 1099-DIV; QDI reported as box 1b on the 1099-DIV; Personal QDI Amount)
b. Display the following data when calculating Personal QDI for Previous or Current Tax Year Estimates: (Dividend Income Paid during Specified Timeframe; Personal QDI Amount; "As-Of Date" [Month and Year] for Fund's estimated QDI percentage of Dividend Income)
Modifications of Process Steps for Brokerage Accounts which Hold Individual Securities and Non-Vanguard Mutual Funds:
1. Since estimated QDI will not be available for all impacted equities and nonfunds, QDI for brokerage accounts could only be calculated for the Previous Tax Year. To provide a calculation for current tax year tax estimates for brokerage accounts, QDI estimates for all underlying securities will be required.
2. Additional data (security/fund level and holding level) is required from the record keeper (which is Pershing for Vanguard Brokerage Accounts). The dividend distribution of each security must be examined within the specified time frame.
3. Calculator must be enhanced to incorporate 180 day holding period for certain preferred securities.
4. Calculator must be enhanced to accommodate Brokerage specific transactions-stock splits, mergers, etc.
5. The accounting method (e.g., FIFO, specific lot, LIFO) is preferably selectable by the investors.
C. Example of a Personal QDI Calculation for a Mutual Fund Investor.

FIG. 7, FIGS. 8A-8G and FIGS. 9A-9C, taken in combination, illustrate one preferred process for performing a personal QDI calculation for 2003 based on transaction data of an investor.

FIG. 7 shows the transaction history and how holding periods are identified.

Figure 8G:
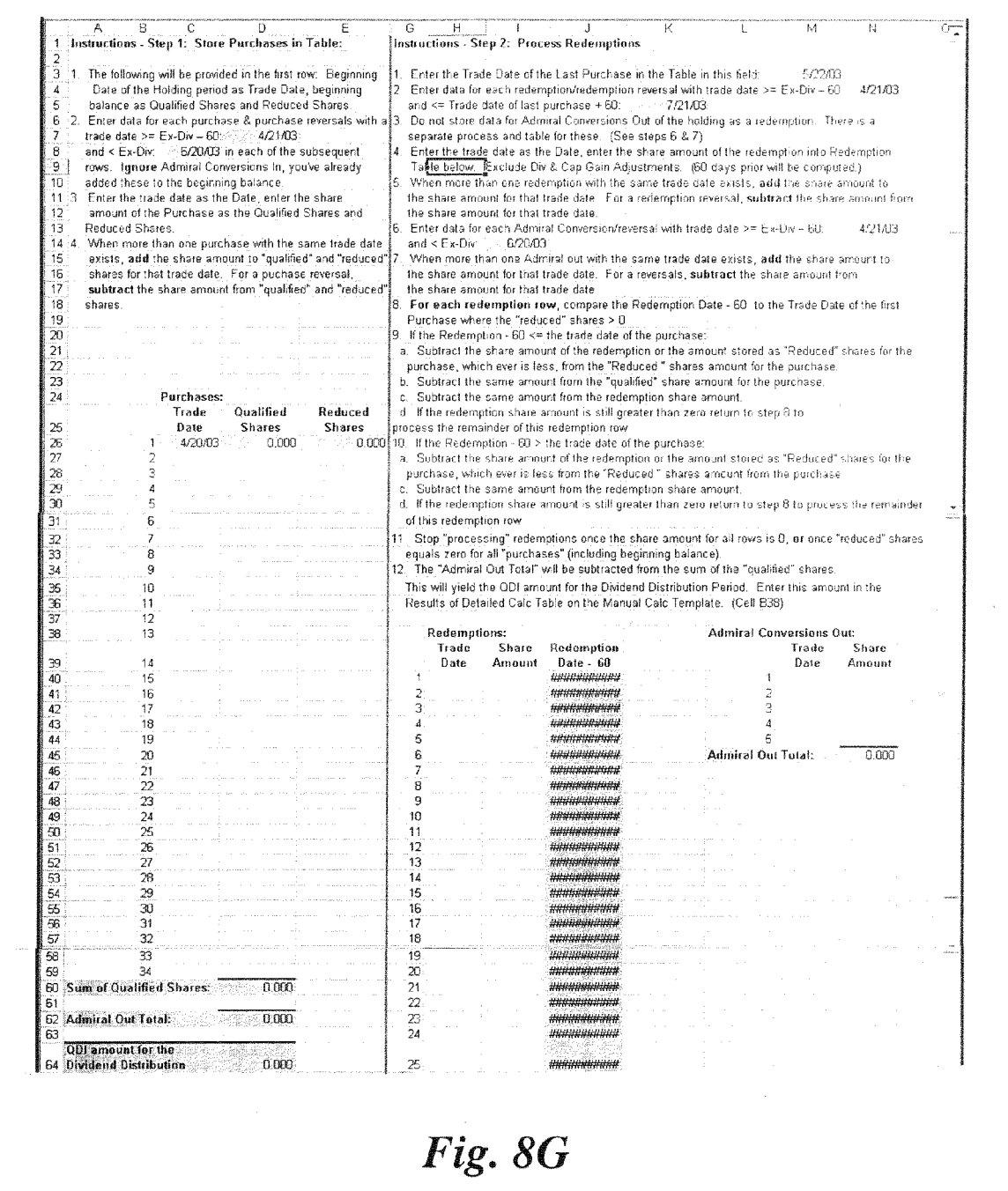

FIGS. 8A-8G, taken together, show an actual QDI calculation and the underlying templates and calculations. FIGS. 8B-8E show a manual calculation template, FIG. 8F shows data calculation clarifications, and FIG. 8G shows detailed calculations. The resultant total personal QDI dollar amount for the fund for tax year 2003 (shown in the lower right-hand corner of FIG. 6) must be multiplied by the fund's actual QDI percentage for Dividend Income and added to the "qualified" Short Term Capital (Short Term Capital Gain for the holding X fund's QDI % for Short Term Capital Gain).

Figure 10:
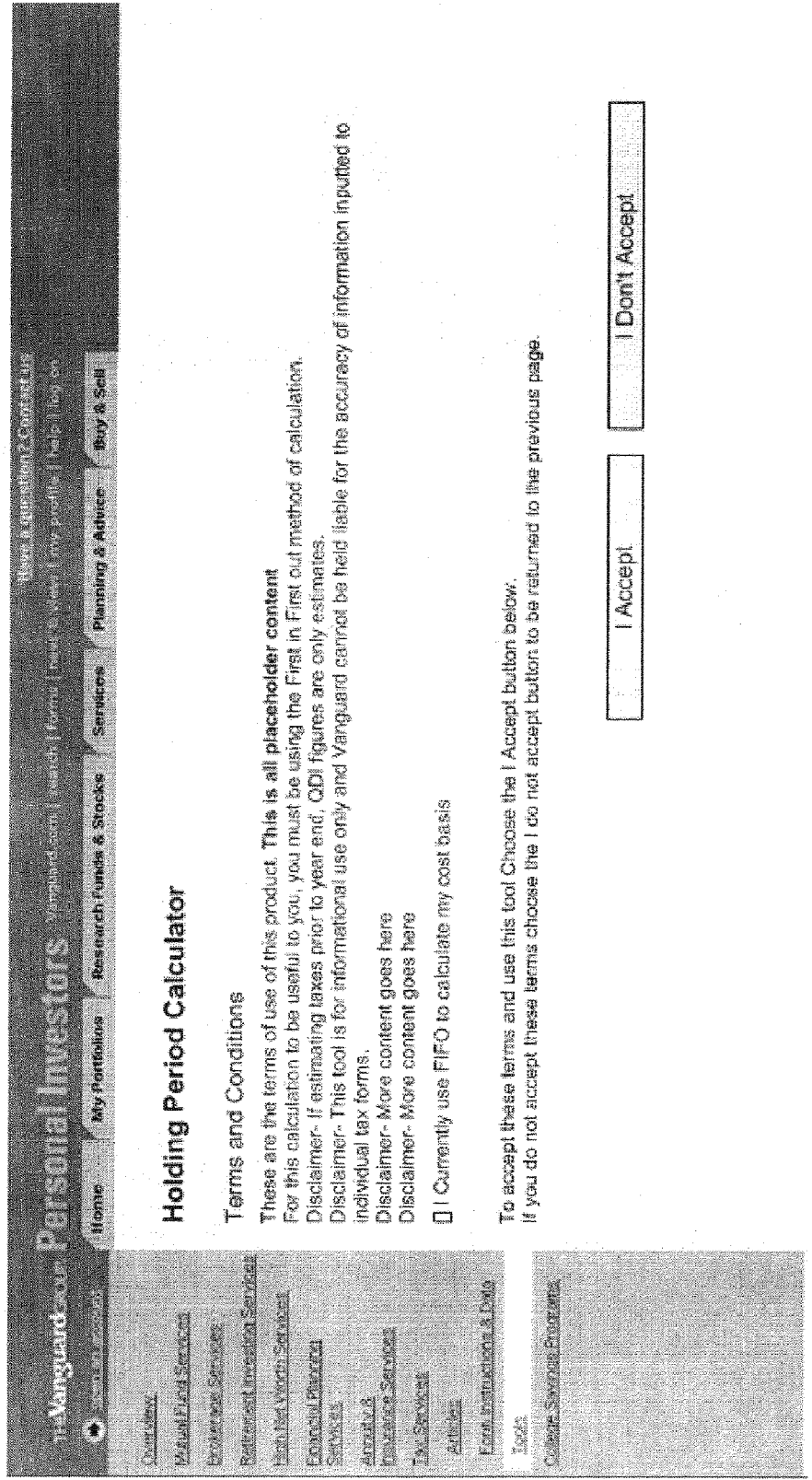

FIGS. 9A-9C show templates used for performing the personal QDI calculation. The first template in FIG. 9A calculates the QDI Share Amount for the holding period of a Dividend Distribution. Additional templates in FIG. 9B calculate Personal QDI for the specified time period after the QDI Amount for each Dividend Distribution is calculated separately. The template instructions are as follows:
1. Enter the Ex-Dividend Date for the Dividend Distribution Period. All other dates will be calculated.
2. Enter the share amounts highlighted with an asterisk. All other amounts will be calculated.
3. Enter the fund's dividend amount per share in dollars. The QDI Amount for the Dividend Distribution period will be calculated.
4. Enter the QDI Amount for the Dividend Distribution period in the template provided to sum the amounts for the specified time period.
5. Enter the amount of shares owned on Record Date and the Dividend Amount per share in dollars in the template provided to sum the amounts for the specified time period. The Dividend Distribution Amount for the specified time period will be calculated. For Previous and Current Year Estimates, this will be displayed as "Dividends Paid to date" on the Results Page. For Previous Tax Year Actuals, this amount will be needed to calculate "qualified" Foreign Taxes Paid.
6. Repeat steps 1-5 for each Dividend Distribution Period within the Calculation time period.
7. For Previous Tax Year Actuals Only: (Skip to step 8 For Estimates)
a. Apply Tax Exempt % for Tax Managed Balanced fund (VAST fund #103)—see FIG. 9C.
b. Complete "Qualified" Foreign Taxes Paid Calculation using separate template. Enter the amounts highlighted with a double asterisk, the rest will be calculated.
c. Add "Qualified" Foreign Taxes Paid Amount from "Qualified" Foreign Taxes Paid Template to Sum of each QDI Dividend Amounts on Time Period totals template.
8. Enter the fund's actual or estimated QDI percentage of Dividend Income on the Time Period Totals Template. This will be multiplied by the Sum of QDI Dividend Amounts (with or without "Qualified Foreign Taxes Paid Amount").
9. For Previous Tax Year Actuals, enter the fund's QDI percentage of Short Term Gain. The Prior Year Short Term Gain Amount multiplied by the fund's QDI percentage of Short Term Gain will be added to the Qualified Dividend Income Amount to yield the final result.
D. Display Screens for Investor Using Holding Period Calculator FIGS. 10-14 are screen shot displays of a user interface that an investor interacts with to obtain a personal QDI from an investment provider.
FIG. 10—Investor accepts terms and conditions.
FIG. 11—Investor selects account(s) on which the calculation is to be performed.

FIG. 12—Investor selects time frame. In one alternative embodiment, there is a default time frame which the user must deselect if a different time frame is desired. In yet another alternative embodiment, the default time frame is nonselectable (e.g., only the previous year time frame can be calculated).

FIG. 13—Results of personal QDI calculation are shown (in this example, the investor selected calculation for prior year's income).

FIG. 14—Results of personal QDI calculation are shown (in this example, the investor selected calculation of estimate for current year).

In one implementation of this user interface, the results shown in FIGS. 13 and 14 are not stored by the investment provider.

The investors referred to herein are either the owners of the accounts, the beneficial owners of the accounts (e.g., the beneficiaries of a trust, a minor, or an incapacitated person), or those persons authorized to act on the accounts (e.g., trustees, guardians, custodians, general partners, members, or holders of a power of attorney). Accordingly, the scope of the present invention includes investors who are the owner or beneficial owners of the accounts, as well as those who are not the beneficial owners of the accounts.

In the preferred embodiment of the present invention, the personal QDI information is presented in the form of a personal QDI statement. However, the personal QDI information may be presented in any manner, and the scope of the present invention includes presentation methods other than formal personal QDI statements.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

The invention claimed is:

1. A computer-implemented method of automatically generating personal qualified dividend income (QDI) information for selected mutual fund investors, each investor having one or more accounts in one or more mutual funds that declare dividend distributions, the method comprising:
   (a) automatically identifying in a computer mutual fund investors who are recipients of a Form 1099-DIV for at least one mutual fund, the Form 1099-DIV including the QDI for each of the mutual funds that are eligible for QDI;
   (b) automatically performing in the computer a personal QDI calculation for each of the recipients;
   (c) automatically comparing in the computer the personal QDI and the QDI on the Form 1099-DIV; and
   (d) generating personal QDI information in the computer for only the mutual fund investors that have personal QDI that is less than the QDI on the Form 1099-DIV.

2. The method of claim 1 wherein step (b) is performed by:
   (i) providing a first electronic database that stores account transaction history data of the mutual fund investors for each of the mutual funds;
   (ii) providing a second electronic database that stores dividend distribution information for each of the mutual funds and information indicating what percentage of dividend distributions of each of the mutual funds are QDI; and
   (iii) automatically determining in the computer the personal QDI for a selected time frame for each of the recipients using a QDI calculation engine which receives and processes the account transaction history data, the dividend distribution information, and the percentage of mutual fund dividend distributions that are QDI from the first and second electronic databases, the account transaction history data being used to provide transaction data for a specific recipient and to determine whether holding period requirements are met for a specific recipient.

3. The method of claim 2 wherein the first electronic database and the second electronic database are subparts of the same electronic database.

4. A computer-implemented method of automatically generating personal qualified dividend income (QDI) information to selected investors, each investor having one or more brokerage accounts that hold one or more stocks that declare dividend distributions, the method comprising:
   (a) automatically identifying in a computer investors who are recipients of a Form 1099-DIV for at least one brokerage account, the Form 1099-DIV including the QDI for each of the brokerage accounts that are eligible for QDI;
   (b) automatically performing in the computer a personal QDI calculation for each of the recipients;
   (c) automatically comparing in the computer the personal QDI and the QDI on the Form 1099-DIV; and
   (d) generating personal QDI information in the computer for only the investors that have personal QDI that is less than the QDI on the Form 1099-DIV.

5. The method of claim 4 wherein step (b) is performed by:
   (i) providing a first electronic database that stores account transaction history data of the investors for each of the stock holdings;
   (ii) providing a second electronic database that stores dividend distribution information for each of the stocks and information indicating what percentage of dividend distributions of each of the stocks are QDI; and
   (iii) automatically determining in the computer the personal QDI for a selected time frame for each of the recipients using a QDI calculation engine which receives and processes the account transaction history data, the dividend distribution information, and the percentage of dividend distributions that are QDI from the first and second electronic databases, the account transaction history data being used to provide transaction data for a specific recipient and to determine whether holding period requirements are met for a specific recipient.

* * * * *